May 8, 1934.                J. N. ICE                1,957,460
CONVERTIBLE WHEEL STRUCTURE FOR VEHICLES
Filed Feb. 28, 1933           4 Sheets-Sheet 1

INVENTOR

May 8, 1934.  J. N. ICE  1,957,460
CONVERTIBLE WHEEL STRUCTURE FOR VEHICLES
Filed Feb. 28, 1933  4 Sheets-Sheet 2

INVENTOR

May 8, 1934.  J. N. ICE  1,957,460
CONVERTIBLE WHEEL STRUCTURE FOR VEHICLES
Filed Feb. 28, 1933  4 Sheets-Sheet 3

INVENTOR
James N. Ice
by his attorneys

May 8, 1934.                J. N. ICE                1,957,460
                CONVERTIBLE WHEEL STRUCTURE FOR VEHICLES
                      Filed Feb. 28, 1933         4 Sheets-Sheet 4

INVENTOR

Patented May 8, 1934

UNITED STATES PATENT OFFICE 1,957,460

CONVERTIBLE WHEEL STRUCTURE FOR VEHICLES

James N. Ice, Wheeling, W. Va., assignor, by direct and mesne assignments, to Samuel O. Pauli, Wellsburg, W. Va.

Application February 28, 1933, Serial No. 658,926

33 Claims. (Cl. 305—6)

This invention relates to land vehicles, and is for a wheel which can be converted from the conventional circular shape to a substantially elliptical shape, and wherein the tread of the wheel becomes a tractor belt when the wheel is so converted.

The conventional wheel has a hub, spokes, a rim and a tire. According to the present invention there is provided a wheel having this combination of elements wherein the spokes are movable relatively to the hub in a radial direction and the rim comprises a number of sections hinged together whereby the wheel can be elongated along its horizontal axis and be decreased in the direction of its vertical axis to a somewhat elliptical form. The tire is mounted for relative movement on the rim. When the wheel is deformed in this manner, means is provided for transmitting motion directly from the axle of the wheel to the tread or tire while permitting the wheel to remain stationary, thus providing a tractor type of drive. It is convertible at will from one shape and style of traction to the other.

The invention may be readily understood by reference to the accompanying drawings, in which.

Figure 1:
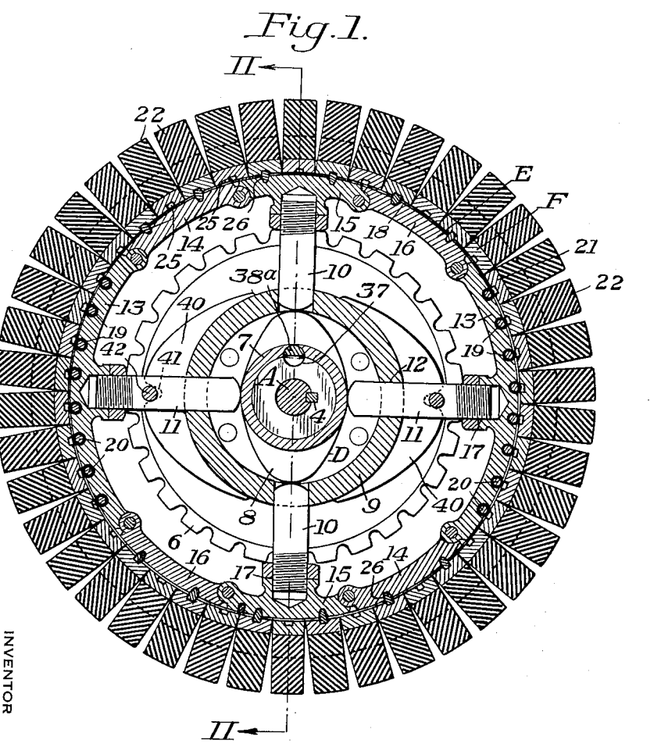
Figure 1 represents a vertical section through the center of the wheel taken in the plane of the wheel.

In the drawings, A designates the conventional driving axle for a vehicle and B designates the axle housing. The wheel comprises a hub C formed of two flanged collars 2 and 3 extending radially outward with respect to the center of the wheel, the flanged collar 2 having its flange 2a located on the outside of the wheel. The flanged collar 3 has its flange 3a located on the inside of the wheel. These two parts 2 and 3 are both keyed to the axle by a key 4 so as to always rotate with the axle. This part of the hub is made in two pieces merely for the purpose of permitting assembly of the other elements of the wheel. On the periphery of the flanges 2a and 3a are sprocket wheels 5 and 6, respectively, having sprocket teeth on the periphery thereof. Fitted on the hub C between the flanges 2a and 3a so as to rotate on this hub is the cam member D shown in Fig. 7. This cam comprises a central sleeve portion 7 which is rotatable on the members 2 and 3 between the flanges thereof, and it has an elliptical cam portion 8.

Figures 6, 7, 8, 9:
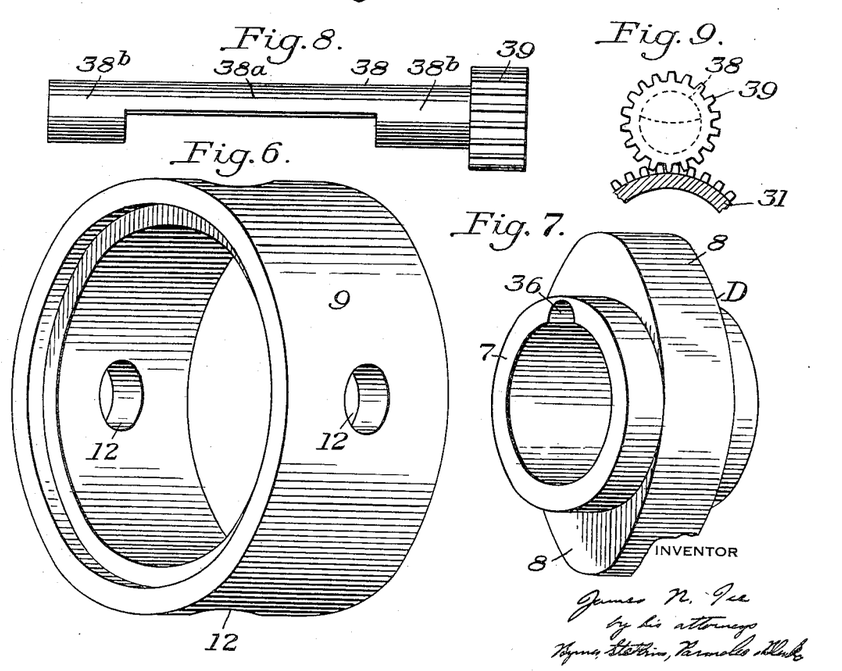
Figure 6 is a perspective view of the ring which comprises part of the hub assembly of the wheel.
Figure 7 is a perspective view of the cam through which motion is transmitted to the spokes for converting the wheel.
Figure 8 is a side elevation of a locking pin or rotatable key through which the operation of the cam is controlled.
Figure 9 is a detail view showing the engagement between the pinion on the end of the locking pin of Fig. 8 and the gear ring through which rotation of this key is effected.

Carried on the flanges 2a and 3a of the hub C and arranged to enclose the cam D is a ring member 9 which is shown in detail in Fig. 6, this ring member having its opposite edges flanged so as to bear on the periphery of the flanges 2a and 3a, the arrangement being such that the hub C can rotate relatively to the ring 9 when necessary.

Passing through the ring 9 are a plurality of spokes. I have shown the wheel as having four spokes and two of these spokes, designated 10, are shorter than the other two, which are designated 11. These spokes have a sliding fit in the holes 12 in the ring 9.

The rim of the wheel, designated generally as E, comprises a number of segments or sections which are hinged together and which, as shown in Fig. 1, may form a completely circular rim. In this rim two of the sections, designated 13, are longer than the remaining sections, and they are diametrically opposite each other. The two sections 13 are connected through a series of shorter sections 14, 15 and 16, the sections 15 being diametrically opposite each other. One section 13 is pivotally connected with the sections 14, having interfitting hinge portions through which a pin passes. The sections 14 and 15 are likewise pivotally connected. The portions 15 and 16 are also connected in this fashion; and the sections 16 in turn are pivotally connected in the same way to the other section 13. In the construction illustrated, the sections 13 each reach through an arc of about 90°, while each series of short sections 14, 15 and 16 reaches through an arc of about 90°.

The long spokes 11 are connected at their outer ends to the longer segments 13 and the short spokes 10 are connected at their outer ends to the short intermediate sections 15. I have shown the connection between the outer ends of the spokes and the portions of the rim to which they connect as being threaded connections in order to permit slight adjustment to be made in the effective lengths of the respective spokes, these threaded connections being designated 17. The inner ends of the spokes are shaped for engagement with the periphery of the cam portion 8 in the member D shown in Fig. 7, and they bear against this cam at all times.

Figure 2:
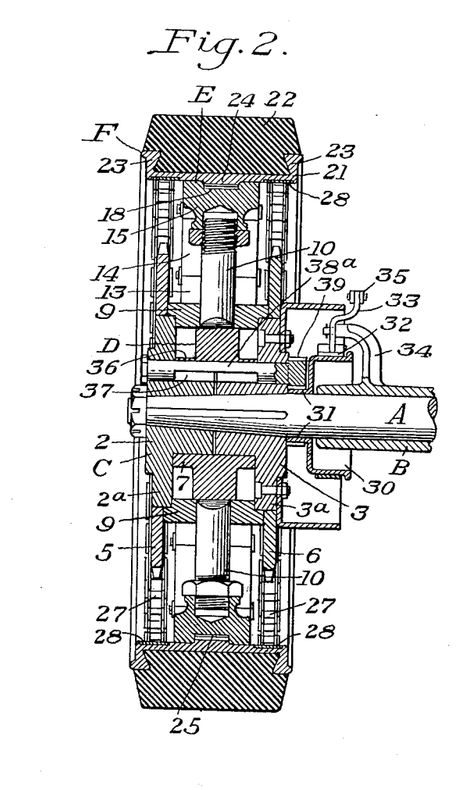
Figure 2 is a transverse vertical section in the plane of line II—II of Fig. 1.
Figure 11:
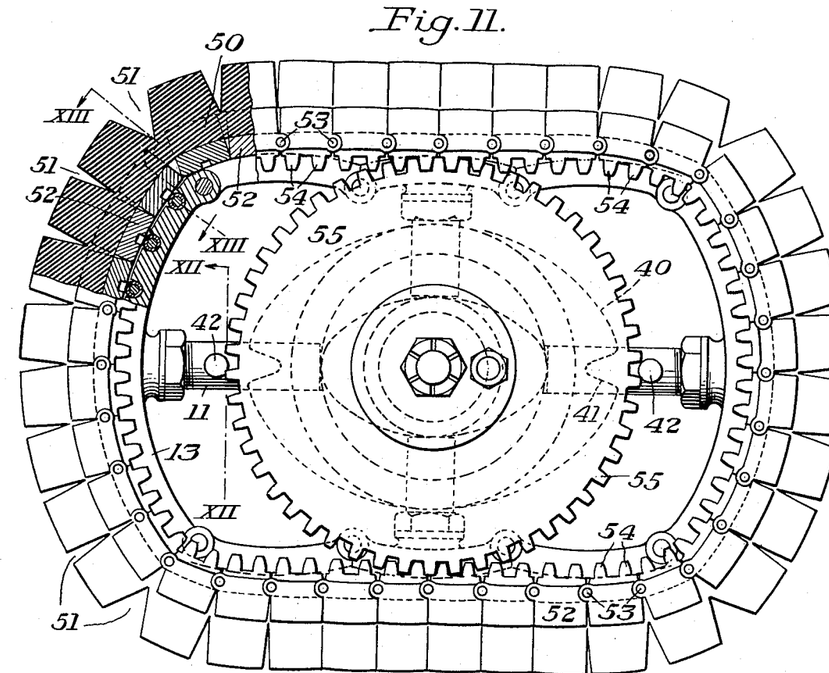
Figure 11 is a side elevation of a slightly modified arrangement, part of the wheel being shown in section.

The segments 13, 14, 15 and 16 have a channel 18 in the periphery thereof. This is best shown in Fig. 2 and Fig. 11. I have shown these channel portions as being provided at various places around the periphery of the rim with transversely extending rollers 19 supported on pins 20 in the rim of the wheel.

Figure 3:
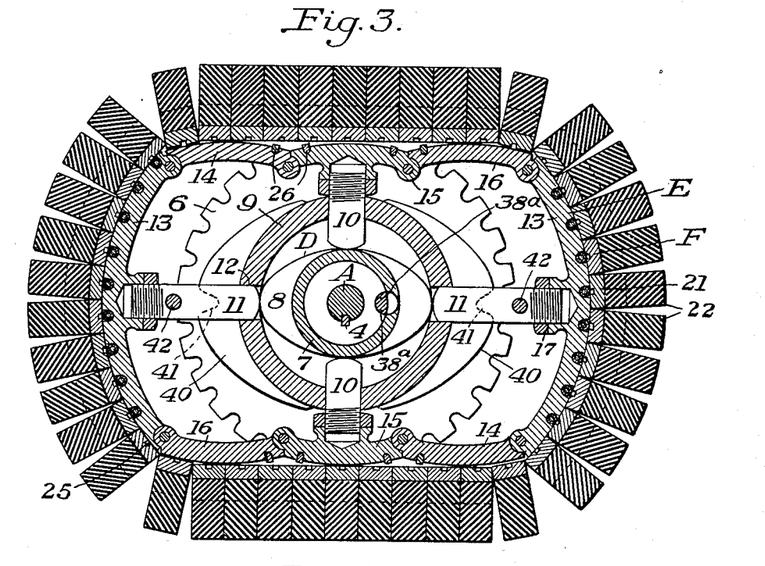
Figure 3 is a view similar to Fig. 1 showing the wheel converted to the elliptical form.
Figures 5, 10:
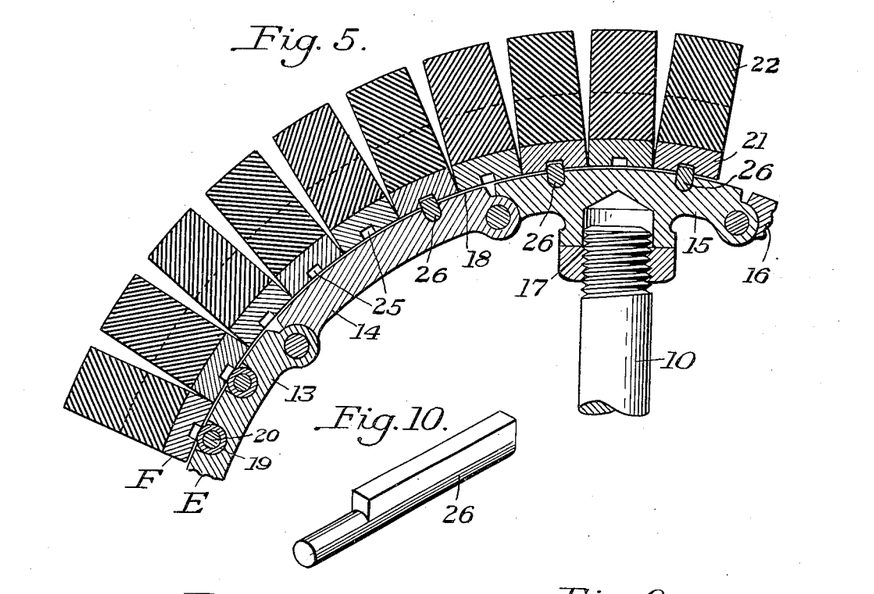
Figure 5 is a detail view on a larger scale showing a portion of the rim of the wheel and the tread.
Figure 10 is a detail view of a key mounted at different positions in the rim of the wheel for holding the tire or tread against relative movement on the rim when the wheel is in a circular shape.

The tire of the wheel, designated generally as F, comprises a number of segments 21 each of which preferably carries a tread block 22 between the flanged sides 23 thereof. Each of these blocks 21 has a central projection 24 on the inside thereof which projects into the channel 18 on the periphery of the rim, and which portions are adapted to engage the rollers 19. These blocks or segments also preferably have transversely extending recesses 25 therein. Mounted in the periphery of the segments 14, 15 and 16, as best shown in Figs. 3 and 5, are transversely extending keys 26 which are shown in detail in Fig. 10, and which are adapted, when the wheel is circular, to engage in such notches or recesses 25 as may register therewith. The keys 26 are so located on the segments 14, 15 and 16 as to move out of engagement with the tread portion of the wheel when the wheel is collapsed, as will hereinafter more fully appear.

Figure 4:
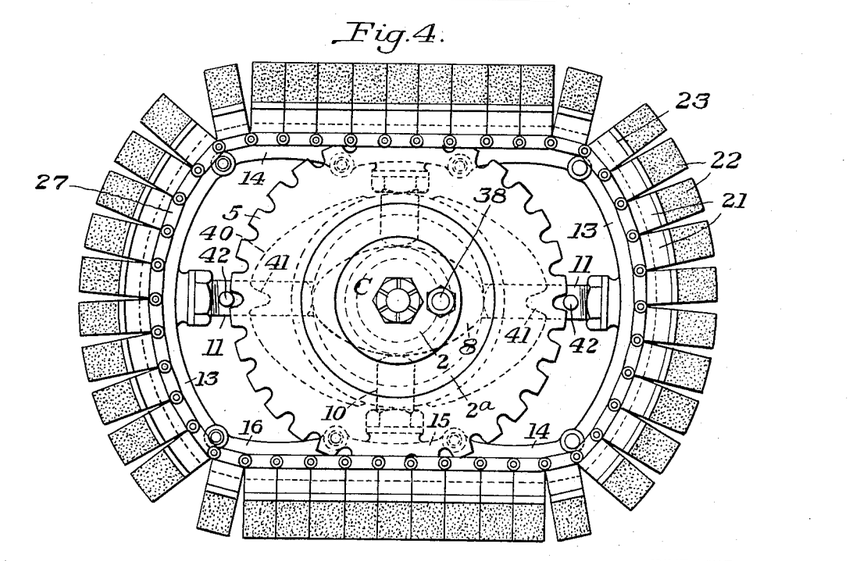
Figure 4 is a side elevation of the wheel deformed as shown in Fig. 3.

When the elliptical cam D has its major axis in diametrical alinement with the short spokes 10, the wheel is circular as shown in Fig. 1. If, however, the cam is rotated 90° so that its major axis is in alinement with the spokes 11, the spokes 11 will be forced outwardly in a radial direction, while the spokes 10 will be free to slide inwardly in a radial direction. When this happens, the two larger rim segments 13 will be forced apart, as shown in Figs. 3 and 4, while the portions 14, 15 and 16 of the rim move down substantially into the same plane at the top and bottom of the wheel so that the contour of the wheel becomes substantially elliptical instead of circular. When the wheel is deformed in this fashion, the keys 26, as shown in Fig. 3, are in a plane below the plane of the bottom of the tire so that they normally engage the transverse slots 25.

The sections 21 of the tire are all connected together at each side of the wheel by sprocket chains 27, the sprocket chains having portions 28 which are welded or otherwise secured to the inside surface of the members 21. In this way the individual segments are all flexibly connected.

When the wheel is collapsed to the position shown in Figs. 3 and 4, the sprocket chains 27 at the top and bottom of the wheel come into engagement with the sprocket wheels 5 and 6 so that the teeth of the sprocket wheels will engage in the sprocket chain.

When the wheel is used as a circular wheel, the keys 26 prevent the tire from slipping relatively to the rim, or prevent the rim from rotating inside the tire. When the wheel is collapsed, however, and the keys 26 move out of engagement with the tire, the tire, which also deforms to conform to the contour of the collapsed wheel, forms an endless belt which is free to move about the periphery of the wheel, and the rollers 19 reduce the friction between the tire and the rim to facilitate relative movement.

When the wheel is in the circular form shown in Fig. 1 motion is transmitted from the axle through the hub assembly and spokes to the rim of the wheel. When, however, the wheel is collapsed, the ring 9 through which the spokes pass does not rotate with the axle, although the sprocket wheels 5 and 6 do, and in this way motion is transmitted from the axle through the sprocket wheels to the tire to cause the tire to travel around on the periphery of the wheel while the wheel itself remains stationary. An endless tractor belt drive is thus provided.

The invention contemplates the provision of means by which the wheel may be operated from the circular to the deformed position, or from the deformed to the circular position, under the vehicle's own power and from a convenient point on the vehicle, as for instance, a point adjacent the operator's seat. For this purpose there is provided on the axle between the axle housing B and the hub member 3 a drum 30 having a sleeve portion 31 which bears on the axle and which has an annular series of teeth (see Fig. 9). Passing around the brake drum is a brake band 32 and a brake band operating mechanism 33 is mounted on the axle housing, there being shown a bracket 34 for this purpose. An operating link 35 serves to effect the operation of the brake band. This link 35 may connect onto a pedal or hand lever adjacent the operator's seat, this, however, not being shown. By tightening the brake band 32, the drum and sleeve 31 may be held against rotation, and by releasing the brake band the drum and toothed sleeve portion 31 are free to rotate with the axle A.

As shown in Fig. 7, the inside of the sleeve portion 7 of the cam D has an axially extending semi-circular groove or notch 36 therein. Likewise, as shown in Fig. 1, the hub portion C comprising the members 2 and 3 has an axially extending semi-circular groove or notch 37 which registers with the groove 36 in the member D when the wheel is in the circular position shown in Fig. 1.

Supported for rotation in the flanges 2a and 3a of the members 2 and 3 is a rotatable key, shown in detail in Fig. 8. This key, designated 38, has an intermediate portion 38a of semi-circular cross-section, and has fully circular end portions 38b which have their bearing in the flanges 2a and 3a. At one end of this key is a pinion 39 which meshes with the gear ring 31 attached to the brake drum 30. Since the key 38 has its bearing in the flanges 2a and 3a of the members 2 and 3, and since this portion of the hub is keyed to the axle, it will be seen that in the operation of the wheel the key 38 always rotates with the axle, as does the hub portion C. When the key 38 is rotated about its own axis, the semi-circular portion 38a thereof enters either the groove 37 in the hub or the groove 36 in the sleeve of the cam D. In Fig. 1 this part of the key is shown as being received in the groove 36. When the key is rotated 180° from the position shown in Fig. 1, it is clear of the groove 36 and is received entirely within the groove 37, as shown in Fig. 3.

When the wheel is operating in its erected position, i. e., as a round wheel, the cam is in the position shown in Fig. 1 in which the two shorter spokes are in alinement with the long axis of the cam. As long as the wheel is to be used in the erected shape the key 38 is turned to a position 180° from that shown in Fig. 1, in which position it is received entirely within the groove 37 in the hub assembly. When it is desired to deform the wheel to function as a tractor, the operator of the vehicle momentarily applies pressure to the brake 32 to hold the brake drum 30 with its gear ring 31 against rotation and at a time when the axle A is rotating. Just as soon as the drum 30 is held against rotation relatively to the axle, the pinion 39 on the end of the key 38 is caused to rotate about its own axis, turning the key. Since the key has only to be turned 180°, the brake 32 is applied only for a brief moment. The key is thereby turned to the position shown in Fig. 1, and the brake 32 is released. With the key in this position, the cam unit D becomes keyed to the hub of the wheel so as to turn with the axle. Upon further turning of the axle the cam D will rotate to the position shown in Fig. 3, allowing the wheel to deform to a substantially elliptical shape. As soon as the cam turns and the wheel deforms, the operator again applies the brake 32 to the drum 30 and causes the key 38 to rotate 180° to the position shown in Fig. 3 so as to permit the hub to turn inside the cam without turning the cam. When the wheel is deformed, the gear teeth on the sprockets 5 and 6 enter into engagement with the sprocket chains 27 on the tire, this engagement being maintained at the top and bottom of the wheel. The sprockets, being carried on the hub C, rotate with the axle. The spokes, however, being carried in the ring 9, do not rotate with the axle. The sprockets thus serve to transmit motion to the tire, while the deformed rim of the wheel, with its rollers 19, forms a track on which the tire moves. At this time the keys 26 are moved to a position where they cannot engage the tire, thus leaving the tire free for such relative movement on the rim.

In deforming the wheel, the tread surface of the wheel in contact with the ground is increased so that the deformed wheel sinks to a less depth in soft ground than does the round wheel. Moreover, the distance from the axle to the point where the wheel contacts with the ground is shortened so that the power of the axle is effective through a shorter radius and an increase of power is obtained. An increase of power is also gained by reason of the fact that when the wheel is circular the tire, along with the rest of the wheel structure, makes one complete revolution with each rotation of the axis. When the tire is being driven through the sprockets, however, one rotation of the axle does not give a complete revolution of the tire. In these two respects the vehicle is caused to travel slower when the wheel is deformed than when it is round, but with more power.

When it is desired to erect the wheel when it is in the collapsed position, the operation previously described is repeated, the operator momentarily operating the brake 32 to first cause a partial rotation of the key 38. When the key 38 has been turned so as to transmit motion from the hub to the cam D, the operator releases the brake 32 and allows the axle to turn the cam D through an arc of 90°, forcing the short spokes 10 radially outwardly and allowing the long spokes 11 to move radially inwardly. When the wheel has been erected or restored to the round position, the operator again momentarily applies the brake 32 to turn the cam 38. With a little experience the operator can determine just how quickly to operate and release the brake 32, and if the key has been given a slight overtravel or undertravel it does not matter because under the strain of operation it naturally tends to seek the normal position shown in Fig. 3, wherein it does not transmit motion to the cam.

Figure 12:
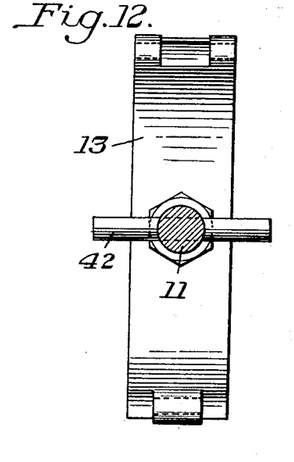
Figure 12 is a detail view showing the inside face of one of the rim segments and showing the spoke in section, the view being a section in substantially the plane of line XII—XII of Fig. 11.
Figure 13:
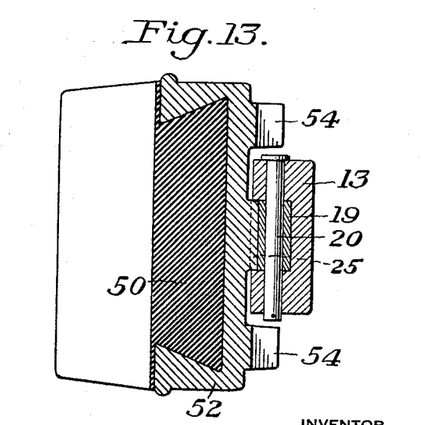
Figure 13 is a transverse vertical section through the rim and tire in the plane of line XIII—XIII of Fig. 11.

For transmitting rotative movement from the axle to the wheel when the wheel is in a circular form, the inner faces of the sprockets 5 and 6 are provided with substantially cam-shaped flange portions 40, these portions being located at the diametrically opposite points on the sprockets. In each of these cam portions is a notch 41. The long spokes 11 are provided with transverse projections or pins 42. These pins are so positioned that when the wheel is round, as shown in Fig. 1, the pins will engage in the notches 41 and thereby serve to transmit motion from the sprockets, which always revolve with the axle to the long spokes. When the wheel is converted to a tractor form of drive, the pins 42 are moved radially outward so that they no longer engage in the notches 41, thus leaving the sprockets free to rotate without turning the spokes of the wheel. In Fig. 12 the transverse pin in the spoke 11 is shown in detail. The length of the transverse pin is such that it will pass down between the sprockets 5 and 6, but it has to engage the notches in the flanges 40.

It will thus be seen that the invention provides a wheel which can be used as an ordinary wheel on firm road surfaces and under normal load conditions. Where the surface over which the vehicle is traveling, however, is soft, and a greater traction and greater power is required, the wheel can be deformed to provide a larger tread surface in contact with the ground, and to make the power of the axle more effective at the periphery of the wheel, both through exerting this power through a shorter radius and by reducing the driving ratio between the axle and the tire from a one-to-one ratio to a fraction of a revolution of the tire to a complete revolution of the axle.

While I have shown the tread of the tire as comprising individual rubber blocks carried on the metal tire segments, the tread portion of the tire may be in the form illustrated in Fig. 11 in which it comprises a rubber belt 50 having notches 51 cut part way therethrough. The continuous belt is carried on the metal tire segments, while the notches 51 permit the tread to open sufficiently to bend around the curved portions of the wheel. Also, instead of using a chain carried on the segments of the tire, the segments of the tire, designated 52 in Fig. 11, may be pivotally connected together as shown at 53, thus forming a continuous link belt or tire and these tire segments can be provided with means such as gear teeth 54 for direct engagement with driving pinions or gears 55 corresponding to the sprocket wheels 5 and 6. The term "sprocket wheel" as used herein therefore includes either the gear 55 for engagement with the teeth 54 on the side of the sections 52, or the sprocket wheels 5 and 6 for cooperation with a roller chain secured to the tire sections. The term "tire" as used herein designates the metal sections, while the surrounding tread portion of rubber, either in the form of individual blocks or in the form of a continuous belt suitably notched, is designated the tread.

Moreover, the arrangement provides a wheel which can be converted from one form to the other under the power of the vehicle itself and from a point remote from the wheel. The wheel can be of a size comparable to standard truck wheels, and the number of parts is not such as to render the cost of the wheel prohibitive. The construction of the wheel is such that no modification of the vehicle itself is necessary to adapt the wheels to use on standard vehicles, it being merely necessary to remove the standard wheel and put the present wheel on the driving axle in its place.

While I have shown a specific embodiment of my invention, it will be understood that this is merely illustrative and that various modifications and changes may be made in the construction and arrangement of the various parts within the contemplation of my invention and under the scope of the following claims.

I claim:

1. A convertible wheel structure comprising a rim formed of a plurality of relatively movable segments, means for effecting relative movement of the segments to permit changing of the contour of the rim from a circular to a non-circular form, and a tire surrounding the rim and comprising a plurality of connected sections, a hub structure, and cooperating means on the hub and tire for effecting movement of the tire about the rim when the rim is in a non-circular form.

2. A convertible wheel structure comprising a rim formed of a plurality of relatively movable segments, means for effecting relative movement of the segments to permit changing of the contour of the rim from a circular to a non-circular form, a tire surrounding the rim and comprising a plurality of connected sections, a hub structure, cooperating means on the hub and tire for effecting movement of the tire about the rim when the rim is in a non-circular form, and cooperating means on the rim and tire for holding the tire against relative movement on the rim when the rim is in a circular form.

3. A convertible wheel for vehicles comprising a rim deformable from a circular form to a substantially elliptical form, a flexible tire on the rim deformable with the rim, and means for selectively changing the rim from one form to the other.

4. A convertible wheel for vehicles comprising a rim deformable from a circular form to a substantially elliptical form, a flexible tire on the rim deformable with the rim, means for selectively changing the rim from one form to the other, and cooperating means on the rim and tire for holding the tire against relative movement on the rim when the rim is in circular form, said means being inoperative when the rim is in the substantially elliptical form.

5. A convertible wheel for vehicles comprising a rim deformable from a circular form to a substantially elliptical form, a flexible tire on the rim deformable with the rim, means for selectively changing the rim from one form to the other, cooperating means on the rim and tire for holding the tire against relative movement on the rim when the rim is in circular form, said means being inoperative when the rim is in the substantially elliptical form, and means for driving the tire relatively to the rim when the rim is in the substantially elliptical form.

6. A convertible wheel for vehicles comprising a rim deformable from a circular form to a substantially elliptical form, a flexible tire on the rim deformable with the rim, means for selectively changing the rim from one form to the other, cooperating means on the rim and tire for holding the tire against relative movement on the rim when the rim is in circular form, said means being inoperative when the rim is in the substantially elliptical form, and means for driving the tire relatively to the rim when the rim is in the substantially elliptical form, said driving means for the tire being inoperative when the rim is in the circular form.

7. A convertible wheel comprising a rim formed of a plurality of pivotally connected segments and deformable from a circular form to a substantially elliptical form, radially positioned spokes secured to the rim, two diametrically opposite spokes being shorter than two other diametrically opposite spokes, and a relatively movable cam at the center of the wheel providing a bearing for the inner ends of the spokes.

8. A convertible wheel comprising a rim formed of a plurality of pivotally connected segments and deformable from a circular form to a substantially elliptical form, radially positioned spokes secured to the rim, two diametrically opposite spokes being shorter than two other diametrically opposite spokes, and a relatively movable cam at the center of the wheel providing a bearing for the inner ends of the spokes, said cam being substantially elliptical and having its long axis in alinement with the shorter spokes when the rim is circular and having its major axis in alinement with the longer spokes when the wheel is substantially elliptical.

9. A convertible wheel comprising a rim formed of a plurality of pivotally connected segments and deformable from a circular form to a substantially elliptical form, radially positioned spokes secured to the rim, two diametrically opposite spokes being shorter than two other diametrically opposite spokes, a relatively movable cam at the center of the wheel providing a bearing for the inner ends of the spokes, said cam being substantially elliptical and having its long axis in alinement with the shorter spokes when the rim is circular and having its major axis in alinement with the longer spokes when the wheel is substantially elliptical, and means for effecting relative movement of the cam about the axis of the wheel.

10. A convertible wheel for vehicles comprising a hub unit adapted to be keyed to a driving axle, a driving sprocket carried on the hub for rotation with the hub, a substantially elliptical cam on the hub movable relatively about the hub, a rim comprising a plurality of pivotally connected sections surrounding the hub, spokes secured to the rim and bearing against said cam, said cam providing means for moving two diametrically opposite spokes outwardly while permitting radial movement of other spokes inwardly whereby the shape of the rim may be selectively changed from a circular to a substantially elliptical contour, a tire surrounding the rim and movable relatively about the rim, the rim being of greater diameter than the sprocket when the rim is circular, means on the tire for engagement with the sprocket when the rim is substantially elliptical whereby the tire may be driven about the rim when the rim is elliptical, said means being out of engagement with the sprocket when the rim is circular, and means operable only when the rim is in the circular position for holding the tire against relative movement on the rim.

11. A convertible wheel for vehicles comprising a hub unit adapted to be keyed to a driving axle, a driving sprocket carried on the hub for rotation with the hub, a substantially elliptical cam on the hub movable relatively about the hub, a rim comprising a plurality of pivotally connected sections surrounding the hub, spokes secured to the rim and bearing against said cam, said cam providing means for moving two diametrically opposite spokes outwardly while permitting radial movement of other spokes inwardly whereby the shape of the rim may be selectively changed from a circular to a substantially elliptical contour, a tire surrounding the rim and movable relatively about the rim, the rim being of greater diameter than the sprocket when the rim is circular, means on the tire for engagement with the sprocket when the rim is substantially elliptical whereby the tire may be driven about the rim when the rim is elliptical, said means being out of engagement with the sprocket when the rim is circular, means operable only when the rim is in the circular position for holding the tire against relative movement on the rim, and cooperating means on the tire and rim providing an anti-friction bearing for the tire when the rim is in the substantially elliptical form.

12. A convertible wheel for vehicles comprising a hub unit adapted to be keyed to a driving axle, a driving sprocket carried on the hub for rotation with the hub, a substantially elliptical cam on the hub movable relatively about the hub, a rim comprising a plurality of pivotally connected sections surrounding the hub, spokes secured to the rim and bearing against said cam, said cam providing means for moving two diametrically opposite spokes outwardly while permitting radial movement of other spokes inwardly whereby the shape of the rim may be selectively changed from a circular to a substantially elliptical contour, a tire surrounding the rim and movable relatively about the rim, the rim being of greater diameter than the sprocket when the rim is circular, means on the tire for engagement with the sprocket when the rim is substantially elliptical whereby the tire may be driven about the rim when the rim is elliptical, said means being out of engagement with the sprocket when the rim is circular, means operable only when the rim is in the circular position for holding the tire against relative movement on the rim, and selectively operable means for effecting relative movement of the cam.

13. A convertible wheel for vehicles comprising a hub unit adapted to be keyed to a driving axle, a driving sprocket carried on the hub for rotation with the hub, a substantially elliptical cam on the hub movable relatively about the hub, a rim comprising a plurality of pivotally connected sections surrounding the hub, spokes secured to the rim and bearing against said cam, said cam providing means for moving two diametrically opposite spokes outwardly while permitting radial movement of other spokes inwardly whereby the shape of the rim may be selectively changed from a circular to a substantially elliptical contour, a tire surrounding the rim and movable relatively about the rim, the rim being of greater diameter than the sprocket when the rim is circular, means on the tire for engagement with the sprocket when the rim is substantially elliptical whereby the tire may be driven about the rim when the rim is elliptical, said means being out of engagement with the sprocket when the rim is circular, means operable only when the rim is in the circular position for holding the tire against relative movement on the rim, and means for effecting relative movement of the cam, said means comprising a key mounted in the hub and movable in the hub into and out of cam engaging position.

14. A convertible wheel for vehicles comprising a hub unit adapted to be keyed to a driving axle, a driving sprocket carried on the hub for rotation with the hub, a substantially elliptical cam on the hub movable relatively about the hub, a rim comprising a plurality of pivotally connected sections surrounding the hub, spokes secured to the rim and bearing against said cam, said cam providing means for moving two diametrically opposite spokes outwardly while permitting radial movement of other spokes inwardly whereby the shape of the rim may be selectively changed from a circular to a substantially elliptical contour, a tire surrounding the rim and movable relatively about the rim, the rim being of greater diameter than the sprocket when the rim is circular, means on the tire for engagement with the sprocket when the rim is substantially elliptical whereby the tire may be driven about the rim when the rim is elliptical, said means being out of engagement with the sprocket when the rim is circular, means operable only when the rim is in the circular position for holding the tire against relative movement on the rim, means for effecting relative movement of the cam, said means comprising a key mounted in the hub and movable in the hub into and out of cam engaging position, and means for effecting operation of said key from one position to the other while the hub is rotating.

15. A convertible wheel for vehicles comprising a hub unit adapted to be keyed to a driving axle, a driving sprocket carried on the hub for rotation with the hub, a substantially elliptical cam on the hub movable relatively about the hub, a rim comprising a plurality of pivotally connected sections surrounding the hub, spokes secured to the rim and bearing against said cam, said cam providing means for moving two diametrically opposite spokes outwardly while permitting radial movement of other spokes inwardly whereby the shape of the rim may be selectively changed from a circular to a substantially elliptical contour, a tire surrounding the rim and movable relatively about the rim, the rim being of greater diameter than the sprocket when the rim is circular, means on the tire for engagement with the sprocket when the rim is substantially elliptical whereby the tire may be driven about the rim when the rim is elliptical, said means being out of engagement with the sprocket when the rim is circular, means operable only when the rim is in the circular position for holding the tire against relative movement on the rim, selectively operable means for effecting relative movement of the cam, said means comprising a key mounted in the hub and movable in the hub into and out of cam engaging position, means for effecting operation of said key from one position to the other while the hub is rotating, said means comprising a brake drum having an annular rack thereon and a pinion on the key engaging said rack, and means for holding the brake drum against rotation with the hub when operation of the key from one position to the other is to be effected.

16. A convertible wheel for vehicles comprising a rim deformable from a circular position to a substantially elliptical form, means for selectively changing the form from one shape to the other and for holding it in either shape, a deformable tire on the rim, and means for driving the tire relatively to the rim when the rim is in the elliptical form, said means being inoperative when the rim is in the circular form.

17. A convertible wheel for vehicles comprising a rim deformable from a circular position to a substantially elliptical form, means for selectively changing the form from one shape to the other and for holding it in either shape, a deformable tire on the rim, and means for driving the tire relatively to the rim when the rim is in the elliptical form, said means being inoperative when the rim is in the circular form, said means comprising a hub and a sprocket wheel on the hub, the tire having a sprocket chain thereon which engages the sprocket wheel only when the rim is in the elliptical form, said hub being rotatable relatively to the rim when the rim is in the elliptical form.

18. A convertible wheel for vehicles comprising a rim deformable from a circular position to a substantially elliptical form, means for selectively changing the form from one shape to the other and for holding it in either shape, a deformable tire on the rim, means for driving the tire relatively to the rim when the rim is in the elliptical form, said means being inoperative when the rim is in the circular form, said means comprising a hub and a sprocket wheel on the hub, the tire having a sprocket chain thereon which engages the sprocket wheel only when the rim is in the elliptical form, said hub being rotatable relatively to the rim when the rim is in the elliptical form, and means for holding the rim and tire against relative movement when the rim is in the circular form.

19. A convertible wheel structure for vehicles comprising a rim having two diametrically opposite segments which are relatively long hingedly connected with each other by a series of relatively shorter segments which are hingedly connected to each other and with the longer segments, two diametrically opposite spokes one of which is connected to each of the long segments, two shorter spokes which are diametrically opposite, these spokes being connected to the shorter rim segments, a guide ring near the center of the wheel through which all of said spokes slidably pass, a cam inside the guide ring against which the spokes bear, a hub supporting the cam and on which the cam is mounted for relative rotational movement, an axle keyed to said hub, said cam being of elliptical form and being movable from a position where its major axis is in alinement with the shorter spokes to a position where its major axis is in alinement with the longer spokes, movement of the cam from such position serving to change the contour of the rim from a circular to an elliptical shape, a deformable tire surrounding the rim and comprising a plurality of connected sections forming an endless belt about the rim, said tire having a sprocket chain associated therewith, and a sprocket wheel of smaller diameter than the rim secured to the hub, said sprocket wheel engaging the chain on the tire when the rim is in an elliptical form and being out of contact with the chain when the rim is in a circular form.

20. A convertible wheel structure for vehicles comprising a rim having two diametrically opposite segments which are relatively long hingedly connected with each other by a series of relatively shorter segments which are hingedly connected to each other and with the longer segments, two diametrically opposite spokes one of which is connected to each of the long segments, two shorter spokes which are diametrically opposite, these spokes being connected to the shorter rim segments, a guide ring near the center of the wheel through which all of said spokes slidably pass, a cam inside the guide ring against which the spokes bear, a hub supporting the cam and on which the cam is mounted for relative rotational movement, an axle keyed to said hub, said cam being of elliptical form and being movable from a position where its major axis is in alinement with the shorter spokes to a position where its major axis is in alinement with the longer spokes, movement of the cam from such position serving to change the contour of the rim from a circular to an elliptical shape, a deformable tire surrounding the rim and comprising a plurality of connected sections forming an endless belt about the rim, said tire having a sprocket chain associated therewith, a sprocket wheel of smaller diameter than the rim secured to the hub, said sprocket wheel engaging the chain on the tire when the rim is in an elliptical form and being out of contact with the chain when the rim is in a circular form, and means effective upon the rotation of the axle for moving the cam relatively to the hub for changing the position of the cam to convert the wheel from one shape to the other.

21. A convertible wheel structure for vehicles comprising a rim having two diametrically opposite segments which are relatively long hingedly connected with each other by a series of relatively shorter segments which are hingedly connected to each other and with the longer segments, two diametrically opposite spokes one of which is connected to each of the long segments, two shorter spokes which are diametrically opposite, these spokes being connected to the shorter rim segments, a guide ring near the center of the wheel through which all of said spokes slidably pass, a cam inside the guide ring against which the spokes bear, a hub supporting the cam and on which the cam is mounted for relative rotational movement, an axle keyed to said hub, said cam being of elliptical form and being movable from a position where its major axis is in alinement with the shorter spokes to a position where its major axis is in alinement with the longer spokes, movement of the cam from such position serving to change the contour of the rim from a circular to an elliptical shape, a deformable tire surrounding the rim and comprising a plurality of connected sections forming an endless belt about the rim, said tire having a sprocket chain associated therewith, a sprocket wheel of smaller diameter than the rim secured to the hub, said sprocket wheel engaging the chain on the tire when the rim is in an elliptical form and being out of contact with the chain wheen the rim is in a circular form, means effective upon the rotation of the axle for moving the cam relatively to the hub for changing the position of the cam to convert the wheel from one shape to the other, said means comprising a rotatable key carried on the hub and rotatable on its axis into and out of cam engaging position, and means on the axle for selectively effecting rotation of said key.

22. A convertible wheel for vehicles comprising a rim deformable from a circular form to a substantially elliptical form, a flexible tire on the rim comprising a plurality of pivotally connected segments, a tread means on the tire, means for selectively changing the rim from one form to the other, cooperating means on the rim and tire for holding the tire against relative movement on the rim when the rim is in circular form, said means being inoperative when the rim is in the substantially elliptical form, means for driving the tire relatively to the rim when the rim is in the substantially elliptical form, said driving means for the tire being inoperative when the rim is in the circular form, said means for driving the tire comprising a toothed wheel concentrically positioned inside the rim and mounted for rotation relatively to the rim and adapted to be driven from the vehicle axle, said toothed wheel being of less diameter than the diameter of the wheel when the wheel is circular, and means on the tire sections for engaging the teeth on the wheel when the rim is deformed.

23. A convertible wheel for vehicles comprising a rim deformable from a circular position to a substantially elliptical form, a hub at the center of the wheel, means for selectively changing the form from one shape to the other and for holding it in either shape, a deformable tire on the rim, means on the hub for driving the tire relatively to the rim when the rim is in the elliptical form, and means for transmitting motion from the hub to the rim when the rim is in the circular form.

24. A driven rotatable propulsion means comprising a traction ground engaging element having a substantially circular ground engaging surface adapted to function in said circular form, said element being capable of manipulation to increase the ground engaging contacting surface of said element, means to maintain said element in either of said manipulated positions, and means for operating said latter means to selectively control the operative form of said element.

25. A driven rotatable propulsion means comprising a ground engaging element convertible into either of two forms at will, the element in one of said forms presenting a substantially circular ground engaging surface to function as a wheel, the element in the other of said forms materially increasing the ground engaging contacting surface to cause the element to function as an endless track, and means for operatively and selectively controlling the conversion of the element from either form to the other.

26. A driven rotatable propulsion means comprising a traction ground engaging element, means for converting the element into either of two forms, one of said forms presenting a substantially circular ground engaging surface and functioning as a wheel, the other of said forms presenting a materially increased ground engaging surface and functioning as an endless track, and means for selectively controlling the conversion of the element from one form to the other, and driving connections for the element in either form.

27. A driven rotatable propulsion means comprising a traction ground engaging element convertible at will into a wheel of substantially uniform diameter or an endless track device having a major diameter parallel to the ground surface and a minor diameter substantially at right angles to the surface, and means for converting the element from either form into the other while in motion.

28. A driven rotatable propulsion means comprising a ground engaging element capable of conversion into either of two forms, one of said forms presenting a substantially circular ground engaging surface and functioning as a wheel, the other of said forms presenting an elongated ground engaging surface and functioning as an endless track, manually selected means for converting the element from one form to the other, and means responsive to the manually selected means and incident to the movement of the element as a traction element for converting the element from one form to the other.

29. A driven rotatable propulsion means comprising a traction ground engaging element selectively convertible into either one of two forms, one form of the element presenting a substantial ground engaging surface and functioning as a wheel, the other form presenting a materially elongated ground engaging surface and functioning as an endless track, normally inoperative means serving when operated to convert the element from one form to the other during traction function of the element, and means for selectively rendering said normally inoperative means operative for element conversion purposes.

30. A driven rotatable propulsion means comprising a ground engaging traction element convertible into either of two forms, one of said forms presenting a substantially uniform diameter element and functioning as a wheel, the other of said forms presenting an element having a major and minor diameter and functioning as an endless track, a member carried by the element and responsive to manual control, said member functioning under manual control to vary the diameters of the then form of the element to compel conversion of the element into the other form, and manual means for selectively controlling the member.

31. A driven rotatable propulsion means comprising a traction ground engaging element convertible into either of two distinctive traction forms, means operatively responsive to the movement of the traction element as such and serving in one position to maintain the element in the form having a substantially uniform diameter to serve as a wheel, said means serving in another position to maintain the element in a form having a major dimension substantially parallel with the ground surface to present an effective increased ground engaging length for service as an endless track, and manually operable mechanism for controlling said means.

32. In a vehicle traction propulsion device, a flexible endless traction element, means for supporting said element on a vehicle axle, said supporting means being so constructed and relatively arranged with respect to said element as to form a circular vehicle wheel, and means to manipulate said supporting means to permit said element to function as an endless track device.

33. In a vehicle propulsion device, a ground engaging traction element, means to support said element on a vehicle axle, said supporting means being so constructed and arranged relative to said traction element to operate as one type of propulsion device, and means to manipulate said supporting means to permit said element to function as another type of traction device.

JAMES N. ICE.